(12) United States Patent
Baker et al.

(10) Patent No.: US 10,093,229 B2
(45) Date of Patent: Oct. 9, 2018

(54) SYSTEM FOR DISCOURAGING DISTRACTED DRIVING

(71) Applicant: Nouvelle Engines, Inc., Marianna, FL (US)

(72) Inventors: Robert Baker, Boynton Beach, FL (US); Lynn Baker, Marianna, FL (US)

(73) Assignee: Nouvelle Engines, Inc., Marianna, FL (US)

( * ) Notice: Subject to any disclaimer, the term of this patent is extended or adjusted under 35 U.S.C. 154(b) by 0 days.

(21) Appl. No.: 15/489,965

(22) Filed: Apr. 18, 2017

(65) Prior Publication Data
US 2018/0022276 A1 Jan. 25, 2018

Related U.S. Application Data

(60) Provisional application No. 62/493,930, filed on Jul. 22, 2016.

(51) Int. Cl.
| | | |
|---|---|---|
| G08B 23/00 | (2006.01) | |
| B60Q 9/00 | (2006.01) | |
| B60W 40/08 | (2012.01) | |

(52) U.S. Cl.
CPC .............. *B60Q 9/00* (2013.01); *B60W 40/08* (2013.01); *B60W 2040/0818* (2013.01)

(58) Field of Classification Search
CPC . B60Q 9/00; B60W 40/08; B60W 2040/0818; H04M 3/53; H04M 1/72569; H04M 3/54; H04M 3/436; H04M 2242/14; H04M 2207/18; H04W 4/025; H04W 24/08; H04W 4/14; H04W 4/023; H04W 4/021; H04W 4/02; H04W 4/001; H04W 4/027; H04L 43/16; H04B 17/21; G08B 21/06; G08B 21/02; G08B 21/0453; G08B 21/0211; G08B 21/0407; G08B 21/0415; G08B 21/24; G08B 23/00
USPC .................................................. 340/576, 463
See application file for complete search history.

(56) References Cited

U.S. PATENT DOCUMENTS

| | | |
|---|---|---|
| 7,308,247 B2 | 12/2007 | Thompson et al. |
| 7,986,934 B2 | 7/2011 | Thompson |
| 8,103,402 B2 | 1/2012 | Kozlay |
| 8,145,199 B2 | 3/2012 | Tadayon et al. |
| 8,275,395 B2 | 9/2012 | Howarter et al. |
| 8,295,854 B2 | 10/2012 | Osann, Jr. |
| 8,315,617 B2 | 11/2012 | Tadayon et al. |
| 8,401,578 B2 | 3/2013 | Inselberg |

(Continued)

*Primary Examiner* — Anh V La
(74) *Attorney, Agent, or Firm* — Fleit Gibbons Gutman Bongini Bianco PL; Jon A. Gibbons

(57) ABSTRACT

A system for modifying distracted driving behavior includes a plurality of radio frequency receivers, each radio frequency receiver coupled to an antenna; and a controller including at least one system indicator, the controller coupled to the plurality of radio frequency receivers and to at least one vehicle indicator of a vehicle. A method with the system includes defining an operator space within a vehicle, detecting presence of a mobile communications device within the operator space, detecting an operator attempting to engage the mobile communications device while the vehicle is moving; and in response, interacting with system indicators and vehicle indicators to draw attention to the vehicle and to the operator of the vehicle, and employing more than one level of accountability.

20 Claims, 5 Drawing Sheets

(56) References Cited

U.S. PATENT DOCUMENTS

| | | |
|---|---|---|
| 8,527,013 B2 | 9/2013 | Guba et al. |
| 8,538,402 B2 | 9/2013 | Vidal et al. |
| 8,594,705 B2 | 11/2013 | Osann, Jr. |
| 8,706,143 B1 | 4/2014 | Elias |
| 8,855,682 B2 | 10/2014 | Osann, Jr. |
| 8,868,081 B2 | 10/2014 | Heath et al. |
| 8,914,014 B2 | 12/2014 | Vidal et al. |
| 9,516,529 B2 | 12/2016 | Tzannes et al. |
| 2005/0024188 A1* | 2/2005 | Sider ................ B60H 1/00642 340/425.5 |
| 2010/0297929 A1 | 11/2010 | Harris |
| 2011/0009107 A1 | 1/2011 | Guba et al. |
| 2011/0046845 A1 | 2/2011 | Kozlay |
| 2011/0077032 A1 | 3/2011 | Correale et al. |
| 2011/0105084 A1 | 5/2011 | Chandrasekaran |
| 2011/0105097 A1 | 5/2011 | Tadayon et al. |
| 2011/0111724 A1 | 5/2011 | Baptise |
| 2011/0130132 A1 | 6/2011 | Lipovski |
| 2011/0136480 A1 | 6/2011 | Osann, Jr. |
| 2011/0136509 A1 | 6/2011 | Osann, Jr. |
| 2011/0195699 A1 | 8/2011 | Tadayon et al. |
| 2011/0223939 A1 | 9/2011 | Osann, Jr. |
| 2011/0294465 A1 | 12/2011 | Inselberg |
| 2012/0028682 A1 | 2/2012 | Danne |
| 2012/0149341 A1 | 6/2012 | Tadayon et al. |
| 2012/0214466 A1 | 8/2012 | Tadayon et al. |
| 2012/0214467 A1 | 8/2012 | Tadayon et al. |
| 2012/0214468 A1 | 8/2012 | Tadayon et al. |
| 2012/0214469 A1 | 8/2012 | Tadayon et al. |
| 2012/0214470 A1 | 8/2012 | Tadayon et al. |
| 2012/0214471 A1 | 8/2012 | Tadayon et al. |
| 2012/0214472 A1 | 8/2012 | Tadayon et al. |
| 2012/0220283 A1 | 8/2012 | Tadayon et al. |
| 2012/0220284 A1 | 8/2012 | Tadayon et al. |
| 2012/0238252 A1 | 9/2012 | Levitan et al. |
| 2012/0329444 A1 | 12/2012 | Osann, Jr. |
| 2013/0029650 A1* | 1/2013 | Xiao ................ H04W 4/027 455/417 |
| 2013/0084847 A1* | 4/2013 | Tibbitts ................ H04W 8/245 455/419 |
| 2013/0172018 A1 | 7/2013 | Correale et al. |
| 2013/0189964 A1 | 7/2013 | Thompson |
| 2013/0210406 A1 | 8/2013 | Vidal et al. |
| 2013/0281079 A1 | 10/2013 | Vidal et al. |
| 2013/0316737 A1 | 11/2013 | Guba et al. |
| 2013/0332160 A1 | 12/2013 | Posa |
| 2015/0015430 A1* | 1/2015 | Wang ................ H04K 3/415 342/14 |
| 2015/0017972 A1 | 1/2015 | Osann, Jr. |
| 2015/0084761 A1 | 3/2015 | Bailey et al. |
| 2015/0140953 A1 | 5/2015 | Bull |
| 2015/0163210 A1 | 6/2015 | Meyers et al. |
| 2015/0181414 A1 | 6/2015 | Bretscher et al. |
| 2015/0256999 A1* | 9/2015 | Doorandish ...... H04M 1/72577 455/419 |
| 2016/0101784 A1 | 4/2016 | Olson et al. |

* cited by examiner

SYSTEM FOR DISCOURAGING DISTRACTED DRIVING

BACKGROUND

Field

The present invention relates to modifying undesired and unsafe behaviors while operating a motor vehicle. Such behaviors include texting or engaging the screen of a mobile communications device while operating a motor vehicle.

Related Art

Personal communication devices have dropped in price since their introduction in the 1990's. This has expanded their deployment throughout the general population. With widespread distribution and an untethered connection, the use of such devices occurs in virtually all terrestrial locations. The problem of drivers being distracted by phones that just carried voice communications was initially relatively small, because little visual interaction was required. However, with the advent of smart phones and other screen-based communication devices, distracted driving has grown dramatically. The consequences of losing attention during the act of driving are thousands of deaths and injuries annually. According to a United States government website on this topic, over 3,100 people were killed in motor vehicle crashes involving distracted drivers in 2014. In the same year, over 431,000 were injured for distraction-related driving incidents.

A potential of distracted driving exists for all types of vehicle operators including teenagers, commercial vehicle operators and truckers, farm equipment operators, and recreational vehicle owners, as examples. Anyone who operates a mobile communications device in a way that involves a displacement of focus can be distracted from the primary task of operating a moving vehicle, and severely negative consequences can occur.

One approach to minimizing this behavior and its consequences is to prevent the operation of mobile communications devices in vehicles. The difficulty with this approach is that this action is considered illegal by the Federal or state governments and punishable by severe fines. Section 705 of the Federal Communications Act prohibits a person from using an intercepted radio communication except for general radio or television broadcasts or open radio channels such as Citizen's Band, ham radios or shortwave radios. Many of the alternative arts that address distracted driving attempt to inhibit functions of a mobile communications device when it is operated within a moving vehicle. For example, in U.S. Pat. No. 8,706,143 by John Elias, lock-out mechanisms disable texting functions on handheld computing devices when a user is driving. U.S. Pat. No. 8,315,617 by Tadayon et al., disables some features of a mobile communications device that could cause distraction to a user when the user is engaged in another activity. U.S. Pat. No. 8,868,081 by Heath et al., defines a wireless communications network-based method for disallowing text communications from mobile stations in a moving vehicle. However, Heath et al., does not provide a means to discriminate between devices used by passengers and devices used by operators.

Yet another alternative approach is to disable a vehicle whenever the vehicle operator is attempting to use a mobile communications device and simultaneously drive. Drawbacks to this approach include the safety hazards of immobilization in dangerous locations such as train crossings and the potential loss of vehicle control. Other drawbacks are the risk to other drivers in high speed traffic lanes and the potential loss of warranty from the vehicle manufacturer.

Many other potential solutions focus on technical prevention of the activity. However, it is human nature to attempt to overcome or bypass obstacles, and this characteristic thwarts various technical approaches.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
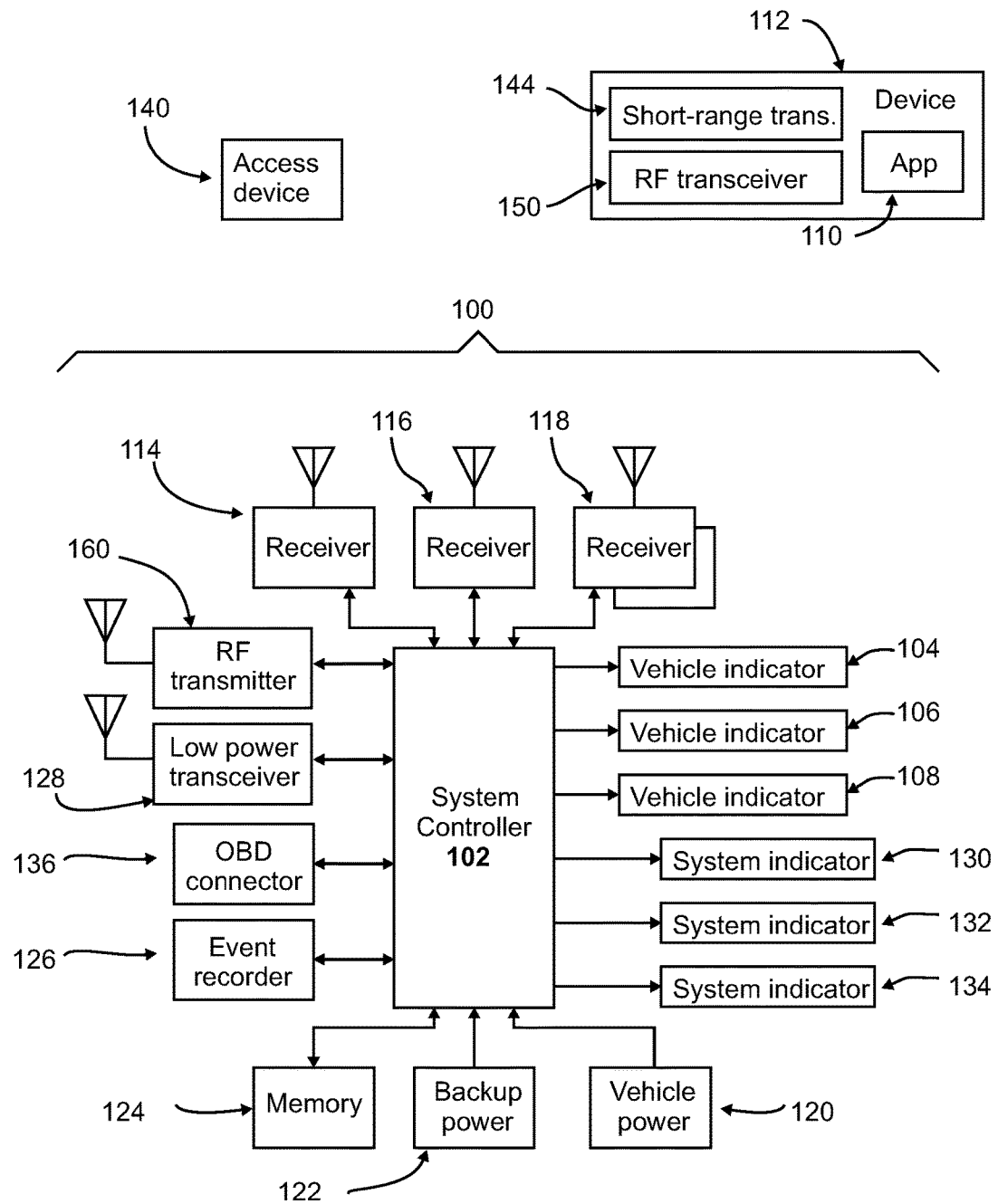
FIG. 1 is a logical block diagram of one embodiment of a system in accordance with the invention.

In the following detailed description, specific examples are described with reference to the accompanying drawings that form a part hereof. These examples describe the system and method in sufficient detail to enable those skilled in the associated arts to practice the invention. It should be understood that these are examples only, and they should not be taken as limiting. Other examples may also be practiced that are consistent with the spirit and intention of the present system and method and apparent to those skilled in the associated arts, and the scope is defined by the appended claims and their equivalents.

There is a need for a system that attempts to change potentially dangerous driving behavior and actions through negative, non-dangerous responses. An objective of this invention is the curbing or elimination of distracted driving by operators of motorized vehicles of many types. Examples of such vehicles include but are not limited to cars, trucks, utility vans, buses, trains, farm equipment and commercial vehicles. For purposes of explanation, a car is used as an example vehicle in all illustrations, but the principles are applicable to other vehicle types. The objective is accomplished by deploying a system that causes a highly noticeable response of system indicators and vehicle indicators to inappropriate driving behavior. These are specifically in response to the use of a distracting device by the operator. These system responses result in drawing attention to the driver and implying inappropriate public behavior. The embarrassment, public pressure, and risk of damage to reputation or public image have a deterrent effect on the negative behavior. The unavoidable negative effects of attempting to use a mobile communications device by the operator while driving have both immediate and lasting consequences. An additional objective is to record the details of events encompassing distracted driving behavior for later review.

Primary elements of the system correspond to a required need. The system detects a vehicle operator's attempts to use a mobile communications device such as a cell phone or tablet. Such use causes various audible and visual vehicle indicators to activate and make an otherwise hidden action prominently noticeable to the public. The minimum preferred embodiment detects the presence of a mobile communications device in the volume of real space where an operator sits when operating a motor vehicle. Another embodiment similarly detects the presence of a mobile communications device in the operator space and further recognizes engagement of the operator with the device. Coincident with movement of the vehicle, this engagement behavior causes a response by the system. Various embodiments are described to achieve these purposes.

There exists therefore a need to focus on changing the undesired human behavior, which is at the root of the distraction problem. The system in accordance with the invention draws attention to unauthorized and potentially illegal driving behavior in demonstrative ways that expose the behavior to the public, authority figures and law enforcement. The system in accordance with the invention adapts to individual behavior and operates with increasing levels of accountability intended to change the behavior. The negative peer pressure combined with the threat of repercussions, restrictions, fines or punishment has a deterrent effect that drives a change in behavior. The system and method in accordance with the invention draw overt and increasing attention to a vehicle operator involved in unauthorized behavior while driving a vehicle in order to change the behavior of the operator.

FIG. 1 is a logical block diagram of one embodiment of a system for discouraging distracted driving (hereinafter "system") 100 in accordance with the invention. The system 100 comprises a system controller (hereinafter "controller") 102 interfacing with a plurality of vehicle indicators 104, 106 and 108. The system 100 responds to the presence of one or more active mobile communications devices 112. By "active" it is meant that the mobile communications device 112 is merely turned on. In other words, for the mobile communications device 112 to be considered active it is not necessary that the operator be viewing a display of the mobile communications device, be manipulating the mobile communications device, or be participating in communication via the mobile communications device. Three (3) vehicle indicators 104, 106 and 108 are shown, but this is by example and is not limiting. The controller 102 is ordinarily powered by vehicle power 120 and is powered by an internal backup power 122 for times when the vehicle power is missing, such as when a vehicle battery is replaced. The controller 102 includes a nonvolatile memory, an interface with an external memory 124 and, in some embodiments, an event data recorder or event recorder 126. Examples of the external memory 124 are portable memory storage devices such as SecureDigital™ or SDHC cards, solid-state memory modules, or other memory cards. System indicators 130, 132 and 134 provide information internally to a vehicle 302 (see FIG. 3) to inform the operator of the vehicle.

In one embodiment, the controller 102 is a microcontroller or other type of computing device. The controller 102 is configured to perform several functions. One function is interfacing with a plurality of antennas, each antenna coupled to one receiver of a plurality of receivers 114 and 116 and optionally 118 to determine the presence of the mobile communications device 112 within an operator space 304 (see FIG. 3). The number of receivers 114 and 116 and optionally 118 is a minimum of two to allow for a location of the mobile communications device 112 to be determined. Another function of the controller 102 is interfacing with various vehicle indicators 104, 106 and 108. Examples of such vehicle indicators 104, 106 and 108 are headlights, fog lights, hazard lights, horn and interior dome light. The number and type of vehicle indicators 104, 106 and 108 are not restricted to the specific amount and type described herein. Still another function of the controller 102 is distributing notifications through the system indicators 130, 132 and 134. Examples of system indicators 130, 132 and 134 include lights, audio output devices (e.g., speakers, buzzers and beepers) and displays to indicate status of some part of the system 100. The number and type of system indicators 130, 132 and 134 are not restricted to the specific number and types described herein.

Most mobile communications devices 112 send regular periodic control signals to their respective network service providers to indicate the device's location and to manage signal transmission among towers of the network service provider. These transmissions are detected by the plurality of receivers 114 and 116 and optionally 118. Receiver 118 represents at least one or more than one receivers based on the implementation chosen for determining a location of the operator's mobile communications device 112. In one embodiment, receivers 114, 116 and 118 are connected to an array of antennas. The receivers 114, 116 and 118 receive signals from the mobile communications device 112 at frequencies corresponding to such mobile communications device. For example, most cellular telephones operate in the ultra-high frequency range of the radio frequency spectrum. The system 100 may have a variety of types of receivers 114, 116 and 118 corresponding to the many different types of mobile communications devices 112. The system 100 is not limited to detection of a single mobile communications device 112 type or manufacturer. There are numerous existing methods of locating signals in 3-dimensional space that are employed using more than one receiver 114, 116 and 118. Examples include but are not limited to triangulation, phase differences, time-of-flight signal measurements, and differential signal strength measurements, among others. The method of detection is not critical to the operation of the system 100. Detection of an active mobile communications device 112 in the operator space 304 (see FIG. 3) while the vehicle 302 is turned on is a minimum condition for a violation notification. By "turned on", it is meant that the engine or motor of the vehicle 302 is turned on.

This embodiment optionally employs detection of movement of the vehicle 302 or the capability of movement of the vehicle to qualify a violation event. In FIG. 1, controller 102 is selectively connected to an on-board diagnostics (hereinafter "OBD") system of the vehicle 302 through an OBD connector 136. Depending on a type of vehicle 302, the controller 102 reads a gear in which the vehicle currently rests. Placement of a gearshift in a gear other than "Park" allows the potential for movement. Another type of information potentially available on the OBD connector 136 is speed of the vehicle 302. The controller 102 uses this information compared with preset values to indicate movement of the vehicle 302 which is a prohibited condition for use of the mobile communications device 112.

Figure 2:
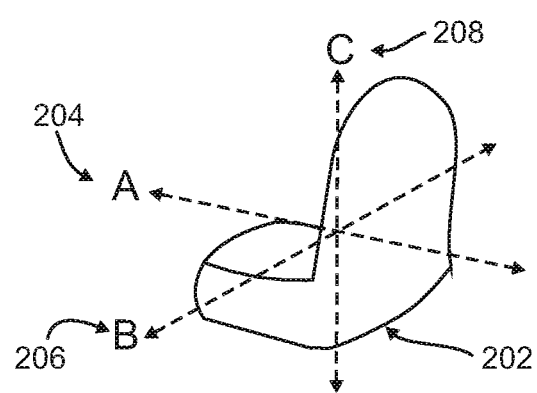
FIG. 2 is a perspective view of an operator's seat and positions of an embodiment using directional antennas.

FIG. 2 is a perspective view of an embodiment using directional antennas. FIG. 2 shows, from a perspective from one side and behind a seat 202 of an operator of the vehicle 302, positions of three (3) directional antennas. A first directional antenna is located directly in front of the seat 202 in, under or on top of a dashboard at position A 204. A second directional antenna is located directly to one side of the seat 202 in or on the driver's door at position B 206. A third directional antenna is located directly overhead the seat 202 at position C 208. Alternatively, the third antenna could be positioned in or under the seat 202. These three (3) positions are orthogonal with each other. Reception at all three (3) receivers 114, 116 and 118 of a transmission from the mobile communications device 112 identifies the location of the source as the seat 202 of the operator. Missing or much lower signal reception at one or more receivers 114, 116 and 118 implies that the location of the source is somewhere other than the seat 202 of the operator, such as a passenger's seat or a location outside the vehicle 302. Signals from such non-operator locations do not trigger a response by the system 100.

One method of detecting the location of the mobile communications device 112 is through use of different reception times by multiple receivers 114, 116 and 118 of a signal from the mobile communications device. Each antenna of a plurality of antennas with known separation distances between each antenna receives, at different times, the signal transmitted by the mobile communications device 112. Calculations based on the different reception times are used to determine the location of the mobile communications device 112.

Figure 3:
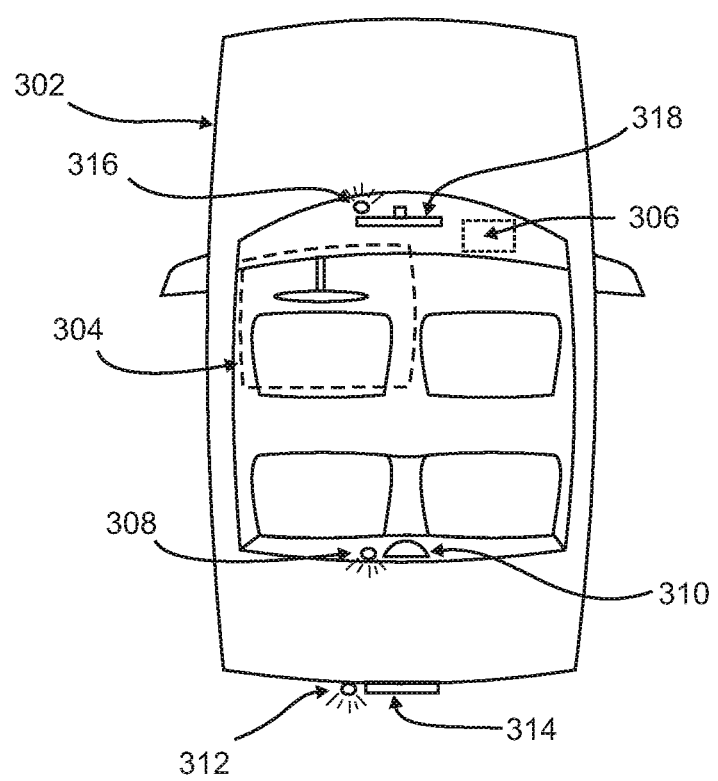
FIG. 3 is an overhead cutaway view of a sketch of a vehicle.

FIG. 3 is an overhead cutaway view of a sketch of a vehicle 302 showing a normal extent of operator space 304, and example positions 306, 308, 310, 312, 314, 316 and 318 of the controller 102, the vehicle indicators 104, 106 and 108, and the system indicators 130, 132 and 134. The operator space 304 of the vehicle 302 is shown as a dotted-line box in FIG. 3. The operator space 304 is defined as the 3-dimensional volume including the space in which the operator of the vehicle 302 sits when operating the vehicle 302. The operator space 304 does not include passenger areas or areas outside the vehicle 302. An operator space 304 is a physical volume having boundaries that define a location typically occupied by an operator, i.e., a driver of the vehicle 302. The boundaries of the operator space 304 are numerically characterized by dimensional parameters. The dimensional parameters of the operator space 304 define a volumetric extent of the operator space through the use of the plurality of the radio frequency receivers 114, 116 and 118. Because the physical volumes of vehicles 302 differ widely from one vehicle type to another, different dimensional parameters are defined for each type of vehicle. Regardless of the method used, the system 100 detects operation of the mobile communications device 112 in the operator space 304 of the vehicle 302.

In preparation for installing the system 100 in a given type of vehicle 302, the dimensional parameters are determined and loaded into the controller 102. Dimensional parameters are developed mathematically, through measurement, by use of a learning mode described herein or by other means. The dimensional parameters for the vehicle 302 of a given type are consistent with the dimensional parameters for another vehicle of the same type. The addition of accessory equipment or furnishings within the vehicle 302 potentially result in a configuration for which dimensional parameters vary for a given vehicle type. Dimensional parameters routinely vary from one type of vehicle 302 to another type of vehicle.

After values of dimensional parameters have been determined for a given type of vehicle 302 and configuration, the values are loaded into the nonvolatile memory of the controller 102. This action establishes dimensions of the operator space 304 for that type of vehicle 302 and configuration to enable the system 100 for use with that vehicle. Loading of dimensional parameters is typically done at time of installation. New dimensional parameters are loaded at other times in response to factors such as improved values or changes in configuration.

The controller 102 is mounted anywhere on the vehicle 302. In one embodiment, the controller 102 is mounted out of sight of the operator of the vehicle 302. Example positions of the controller 102 include under the dashboard, under a seat, in an engine compartment or in a trunk. These positions have reasonable access to vehicle power 120. Location 306 in FIG. 3 is an example of a hidden, under-dashboard position for the controller 102. In the embodiment shown in FIG. 3, there is at least one system indicator 130, 132 and 134 detectable from outside the vehicle 302. There is also at least one system indicator 130, 132 and 134 detectable from inside the vehicle 302. The system indicator 130, 132 and 134 detectable outside is an indicator that can be seen or heard from outside the vehicle 302. The system indicators 130, 132 and 134 are part of the system 100 but not standard equipment on the vehicle 302. One example of the outside-detectable system indicator 130, 132 and 134 is a light 308 that activates in a rear window near an upper brake light 310. Another example is a light 312 mounted in the trunk area near a license plate 314. Yet another example is a light 316 that is visible on back of or around a rear-view mirror 318 and can be seen in front of the vehicle 302. Acceptable system indicators 130, 132 and 134 are any combination of the above system indicators and/or any other system indicator 130, 132 and 134 that can be perceived from outside the vehicle 302.

An inside system indicator 130, 132 and 134 is one that is specifically intended to convey information to the operator. Conveying this information has one or more purposes. One purpose is a warning of a pending or current violation response. Another purpose is alerting the user to a previous violation notification or some other information provided to the operator. An inside system indicator 130, 132 and 134 is a light or audio sound generator, such as buzzer, beeper, or speaker, that can be perceived by the operator. Inside system indicators 130, 132 and 134 are installed at various positions around an interior of the vehicle 302 in order to provide information to the operator.

The controller 102 also interfaces with vehicle indicators 104, 106 and 108 and system indicators 130, 132 and 134 to provide an overt indication of unauthorized behavior. For safety reasons, no vehicle control subsystems are connected to the system 100. The controller 102 sets the frequency of how often and the period of time each internal system indicator 130, 132 and 134 and external vehicle indicator 104, 106 and 108 is activated in a response by the system 100. The amount of time each vehicle indicator 104, 106 and 108 and each system indicator 130, 132 and 134 is active is selected by an authority figure as a preset parameter of the system 100. Examples of an authority figure include employer, managers and supervisors of the operator, a parent or guardian of the operator, a company owner, a fleet owner, a trucking company manager, fleet managers, and a person who owns the vehicle 302.

Another embodiment of the system 100 includes a low-power short-range transceiver 128 coupled to the controller 102. This embodiment allows a communication channel with a corresponding short-range transceiver 144 in the mobile communications device 112 without impeding cellular telephone channels. In this embodiment, a software application or computer program (hereinafter "cooperative application") 110, designed to cooperate with the system 100, is loaded on the mobile communications device 112. The mobile communications device 112 could be a cell phone or smart phone, tablet or other portable device capable of communication. The cooperative application performs at least one of three functions when in the operator space 304. The first function is to regularly send a heartbeat signal to the controller 102 through short-range transceiver 144 to indicate that the particular mobile communications device 112 is present in the operator space 304 when the vehicle 302 is moving. This also validates that part of the system 100 is functioning correctly and has not been tampered with. The second function is that it determines on a dynamic basis whenever the particular mobile communications device 112 is moving steadily. This phenomenon can be attributed to movement of the vehicle 302 in which the device is currently located. The speed information is retained within the application until circumstances occur that dictate a transmission of the violation notification. Movement of the mobile communications device 112 can be determined through various means. Examples of the means include GPS, on-board sensors and communication with the network service provider of the mobile communications device 112. Other means include correspondence with the controller 102 or interaction with another device providing speed information. The third function is to send the violation notification to the controller 102 whenever the vehicle 302 is imputed to be moving and the operator simultaneously engages the particular mobile communications device 112. Engagement can be detected on a tactile surface, such as a tablet or smart phone screen, or keys of the mobile communications device 112.

In one embodiment, the mobile communications device 112 has the cooperative application 110 installed on it. The mobile communications device 112 includes a short-range transceiver 144 to communicate with the controller 102 through its low-power short-range transceiver 128. Non-limiting examples of low-power short-range transmission methodologies are Bluetooth LE and WiFi. The mobile communications device 112 includes a radio frequency transceiver 150. When a mobile communications device 112 is brought into a vehicle, its location is detected by receivers 114, 116 and 118. The receivers 114, 116 and 118 detect the periodic control signal transmissions that the mobile communications device 112 sends to its network service provider through the radio frequency transceiver 150. A program in the controller 102 determines the location of the mobile communications device 112. The mobile communications device 112 then corresponds with the controller 102 over the short-range transceiver channel. The controller 102 transmits a specific handshake signal to the mobile communications device 112. The purpose of the handshake signal is to identify the mobile communications device 112 as being appropriate for monitoring based on its location within the vehicle 302. The specific handshake signal is useful because other mobile communications devices 112 may be present in the vehicle 302 at the same time. The mobile communications device 112 responds to the handshake signal by sending an acknowledgment signal to the controller 102. The acknowledgment signal indicates that the cooperative application 110 is prepared to send the violation notification if the mobile communications device 112 is engaged while the vehicle 302 is determined to be moving. If the mobile communications device 112 is in a non-operator space, the system controller 102 directs the mobile communications device 112 not to send an engagement signal when the device is used. If the mobile communications device 112 is subsequently moved into the operator space 304, the controller 102 directs the mobile communications device 112 to send an engagement signal if the device 112 is used. The engagement signal triggers responses by the controller 102. Among responses by the controller 102 is a recognition response that is conveyed through one or more system indicators 130, 132 and 134. Based on the continued presence of the mobile communications device 112 in the operator space 304, another potential response is a violation notification.

The mobile communications device 112 that does not have the cooperative application 110 installed on it may travel in the vehicle 302 in any non-operator space without triggering a violation response. Examples of a non-operator space include the front and back-seat passenger areas, trunk, glove compartments and under seats. A mobile communications device 112 that does not have the cooperative application 110 installed on it cannot exchange communications with the controller 102. However, introduction of the mobile communications device 112 without the cooperative application 110 into the operator space 304 does cause a reaction by the system 100. The system 100 includes a radio frequency transmitter 160 coupled to the controller 102 for transmitting the violation notification to the authority figure. Because the cooperative application 110 is not present on the mobile communications device 112, the mobile communications device represents a possible opportunity for distracted driving. One example response sequence from the controller 102 is to first indicate a warning inside the vehicle 302 to the occupants. This is followed by the violation response from the controller 102 if the mobile communications device 112 without the cooperative application 110 is not removed within a predetermined period of time. The receivers 114, 116 and 118 help the controller 102 determine whether the mobile communications device 112 is or is not within the operator space 304. The reaction of the system 100 to the mobile communications device 112 in the operator space 304 encourages device owners to install the cooperative application 110 rather than risk stimulating reactions by the system 100.

Occasions arise in which other mobile communications devices of the operator of the vehicle 302 and/or passengers' mobile communications devices (collectively "secondary mobile communications devices") are introduced into the operator space 304 after the operator's mobile communications device 112 is already present in that space. For secondary mobile communications devices without the cooperative application 110, the system 100 reacts as described earlier. Such a response optionally includes giving a warning as a prelude to the violation response. The response occurs if the secondary mobile communications device without the cooperative application 110 is not removed within a predetermined short period of time. For secondary mobile communications devices that have the cooperative application 110 installed, the controller 102 participates in an operation acknowledgment handshake. This correspondence enables the secondary mobile communications device to send the violation notification if the operator attempts to engage in a tactile way with the secondary mobile communications device while the vehicle 302 is moving. When the secondary mobile communications device is removed from the operator space 304, the controller 102 communicates with it to direct it not to send the violation notification. Provided that a secondary mobile communications device is outside the operator space 304, its user can use it for its prescribed purposes without invoking a reaction by the system 100.

In one embodiment, the cooperative application 110 runs in the background of the mobile communications device 112. However, upon an unauthorized action with the mobile communications device 112, the cooperative application 110 causes the violation notification to be sent from the mobile communications device 112 to the controller 102. The minimum content of the violation notification is the identity of the mobile communications device 112. In one embodiment, an additional content of the violation notification is the imputed speed of the vehicle 302. The violation notification optionally includes other specific identification of the mobile communications device 112 that relates the mobile communications device 112 to a specific owner. Alternatively or in addition, such a notification includes the time of day that the event occurred. It also includes the type of violation or unauthorized behavior such as texting or dialing a phone number. Additional optional content of the violation notification is the speed of vehicle 302 at the time of the behavior. One example of an unauthorized action is when the operator of the vehicle 302 attempts to engage the mobile communications device 112 while the vehicle is in operation and is moving. Engaging the mobile communications device 112 involves at least one of touching one or more keys or using a tactile surface of the mobile communications device. These are actions that typically involve at least a momentary viewing of the mobile communications device 112 as well as actions with one or more hands.

In one embodiment, the controller 102 uses the radio frequency transmitter 150 of the mobile communications device 112 for sending the violation notification to one or more authority figures. The violation notification is sent either as a pre-recorded voice message, an instant message, or an email, or in another manner that provides real time performance. In another embodiment, the violation notification is converted to Internet Protocol formats for sending to a mobile communications device or another computer of the authority figure. The violation notification is sent using "push" technology so it is received immediately. One method of receiving the violation notification uses a notification application that is loaded on the mobile communications device or other computer of the authority figure. In one embodiment, the system 100 is configured to transmit a notification of sustained periods of "no violation" at selective intervals to one or more authority figures. The intervals and periods are determined by the one or more authority figures.

The controller 102 manages the functions of the system 100 and has various modes of operation. These operational modes are either partially automated or fully automated and optionally involve human interaction for execution. The various modes of operation include modes for learning, calibration, diagnostic, adjustment, startup, normal, response, recovery and quiescence. The purpose of each mode is as follows.

A learning mode identifies the operator space 304 by moving a portable radio frequency transmitter around within the vehicle 302 equipped with the system 100. The learning mode is useful for determining the dimensional parameters for a specific vehicle of a previously undetermined vehicle type. The learning mode is invoked for installing the system 100 in a type of vehicle 302 in which it has not previously been installed. In this case, dimensional parameters are not yet known. This mode allows an installer to move the portable radio frequency transmitter around the operator space 304 to teach the system 100 the boundaries of the operator space 304 in all directions. This operation determines primary and secondary dimensional parameters for a given make and model of vehicle 302. These parameters are uploaded to an access device 140 for the controller 102, from which they are transferred to databases for use with other vehicles 302 of the same or similar type. In one embodiment, the access device 140 is a laptop or tablet computer. In one embodiment, the access device 140 communicates with the controller 102 by wire.

A calibration mode adjusts dimensions of the operator space 304 in a specific vehicle of previously determined vehicle type. The calibration mode allows fine tuning of the dimensional parameters to better match a specific internal configuration of the vehicle 302. The calibration mode is used when the system 100 is installed in the vehicle 302 of a known type. From one individual vehicle 302 to another, accessories or non-standard equipment have a potential to influence the boundaries of the operator space 304. There exists, therefore, a need to fine-tune dimensional parameters and record values for the individual vehicle 302. In this mode, the installer adjusts the dimensional parameters loaded into the system 100 for this type of vehicle 302 based on results of an individual vehicle test. As with the learning mode, the supporting components are the portable radio frequency transmitter and the access device 140. The access device 140 verifies that the adjusted dimensional parameters are correctly stored in the nonvolatile memory of the controller 102 or in the external memory 124.

A diagnostic mode is for validating that elements and connections of the system 100 are operating properly. A second purpose of the diagnostic mode is to verify that the system 100 has not been tampered with. In a normal mode, the system 100 is operational and monitoring for mobile communications devices 112 in the operator space 304. With the system 100 installed in the vehicle 302, the access device 140 communicates with the controller 102 to diagnose operation of the system 100. In the diagnostic mode, the access device 140 causes the controller 102 to verify correct operation of each of the individual input and output elements of the system. The access device 140 causes the controller 102 to perform diagnostics and tests of the nonvolatile memory. Additional parameters diagnosed include existing conditions as they are measured, such as voltage to the controller 102. External vehicle indicators 104, 106 and 108 are also engaged in this mode to ensure their proper operation. This mode therefore validates that all components are installed and operating correctly. The diagnostic mode also validates that the system 100 has not been tampered with. Other factors or elements are diagnosed in this mode.

An adjustment mode assists the installer or repair technician in inspecting and changing values stored in the nonvolatile memory. Examples of stored values are dimensional parameters, general response levels and response sequences on a per-user basis. Other examples are prescribed output mechanisms associated with each response level, and date and time.

A startup mode occurs whenever the vehicle 302 is started. Initialization of internal circuits takes place, and any indications of the system's presence in the vehicle 302 are demonstrated at this stage. In one embodiment, the controller 102 sends a brief notification through the internal system indicators 130, 132 and 134 to notify the operator that the system 100 is in place and operational. If the operator has the cooperative application 110 installed on the mobile communications device 112, the system 100 transitions automatically from the startup mode to the normal operating mode after a short time. The controller 102 also notifies the operator if the mobile communications device 112 in the operator space 304 does not have the cooperative application 110 installed on it. Notification is done through one or more internal system indicators 130, 132 and 134. An example notification is that the mobile communications device 112 must be removed from the operator space 304 before the vehicle 302 begins moving, or that the cooperative application 110 must be installed. This allows time for the operator to download and install the cooperative application 110 before operating the vehicle 302. Failure to install the cooperative application 110 or to remove the mobile communications device 112 (depending on the embodiment implemented) causes the system 100 to initiate violation notifications as designated in the controller 102.

A normal mode is a standard operating mode for times when the vehicle 302 is turned on and able to move. In this mode, the controller 102 monitors the operator space 304 and analyzes inputs from the receivers 114, 116 and 118 to determine if there are one or more mobile communications devices 112 in the operator space 304. In one embodiment, when the mobile communications device 112 is in the operator space 304, the controller 102 reacts by issuing a violation notification if the device is not removed within a preset number of seconds. In an alternative embodiment, when the mobile communications device 112 is in the operator space 304, the controller 102 determines whether the mobile communications device 112 has the cooperative application 110 installed on it. When the mobile communications device 112 is in the operator space 304 and has the cooperative application 110 installed and operating on it, an operation acknowledgment handshake signal is sent from the controller 102 to the operator's mobile communications device 112. When any mobile communications device 112 is in the operator space 304 but does not have a cooperative application 110 installed on it, the system 100 treats this as a violation condition and initiates a violation response. This response proceeds according to a preset sequence programmed into the controller 102 and stored in the nonvolatile memory. For the embodiment using the cooperative application 110, system 100 responses are selectively set to different values based on the individual with whom the mobile communications device 112 is associated. The system 100 does not react to mobile communications devices 112 outside the operator space 304.

A response mode occurs when the system 100 activates violation indications. The system 100 persists in this state until the causative operator action has ceased and one or more remediation actions are taken by the operator. If a violation response has been generated by the system, one or more internal system indicators 130, 132 and 134 and external vehicle indicators 104, 106 and 108 are activated. The system indicators 130, 132 and 134 and vehicle indicators 104, 106 and 108 provide a visual and/or an audio response of the system 100 to an occurrence of an unauthorized behavior. In one embodiment, the system indicators 130, 132 and 134 and vehicle indicators 104, 106 and 108 remain activated for a predetermined amount of time. The time duration is stored as an operational parameter in the nonvolatile memory. The operational parameters and therefore responses to unauthorized behavior are set differently from individual to individual. This information is stored in the nonvolatile memory. Examples of a response of the system 100 demonstrated through vehicle indicators 104, 106 and 108 are the headlights blinking, hazard lights engaged, the car horn periodically sounding, and the dome light blinking. Demonstrative effects of the system 100 use available equipment of the vehicle 302 and additional devices as selectively added. Violation notifications are also selectively sent to authority figures as previously determined. In the recovery mode, the transition back to normal mode of operation requires overt action on the part of the operator of the vehicle 302. In one embodiment, an example of such an operator action involves bringing the vehicle 302 to a complete stop for a predetermined period of time. Another example is bringing the vehicle 302 to a stop and putting the vehicle in "Park". Yet another example is stopping the vehicle 302 and turning off the ignition for a predetermined period of time. Removing any mobile communications device 112 from the operator space 304 is another overt action taken by the operator to remedy the violation response. Combinations of the aforesaid actions of the vehicle 302 are foreseeable.

The system 100 goes into a recovery mode after cessation of operator cause and beginning of remediation.

The system 100 goes into a quiescent mode with the vehicle 302 turned off but with the vehicle still supplying vehicle power 120 to the system 100. With the vehicle 302 turned off, the system 100 transitions to quiescent mode. In this mode, the controller 102 continues to have vehicle power 120 applied to it, and this power source is monitored. An example of potential tampering is removal of power from the system. In one non-limiting embodiment, such an event is recorded in the nonvolatile memory for later readout. In addition, notifications are provided to the operator through the system indicators 130, 132 and 134 when the vehicle 302 is again started. The notification condition is reset by authorized service personnel or authority figures using the access device 140.

Figure 4:
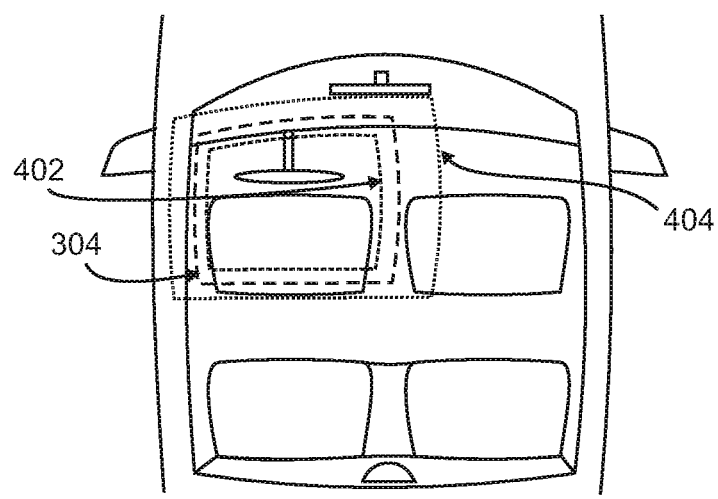
FIG. 4 is an overhead cutaway view of a normal extent of operator space and secondary extent of operator space using alternate dimensional parameters.

FIG. 4 is an overhead cutaway view of a normal extent of the operator space 304 and extent of operator space using alternate dimensional parameters. The system 100 is capable of adapting to conditions in an electronic environment of the vehicle 302 as the vehicle moves. An example of a condition is a change in environmental radio frequency interference or microwave noise due to building or other stationary security systems. Other examples of conditions include broadcast sources, sunspot activity, interference from high voltage transmission lines, or vehicle-induced electrical noise. Adaptation to changing conditions is engaged to ensure reliable performance of the system. At least one additional set of dimensional parameters is defined for each type of vehicle 302. This allows for a smaller operator space 304, indicated by dotted-line box 402, based on the conditions present as the vehicle 302 progresses on its course. Upon detection and recognition of such or related external electronic environmental factors, the controller 102 adjusts dimensional parameters of the operator space 304. This changes the apparent dimensions of the operator space 304. This is accomplished by loading and configuring alternate dimensional parameters for that type of vehicle 302. Dotted-line boxes in FIGS. 3 and 4 are representative of the operator space 304 of the vehicle 302. Changes in an electronic environment may require setting of dimensional parameters to create a more restrictive operator space such as that identified by dotted-line box 402. Similarly, changes in the electronic environment may require setting of dimensional parameters to create a more expansive operator space such as that identified by dotted-line box 404. The system 100 adjusts its operational characteristics based on environmental factors. An example of a characteristic of the system 100 is the sensitivity of receivers 114, 116 and 118.

In one embodiment, the system 100 is also capable of invoking different response levels of the system 100 based on the operator associated with the mobile communications device 112. The various response levels involve use of the variety of vehicle indicators 104, 106 and 108 in different ways. Different response levels are implemented by engaging at least one of one or more vehicle indicators 104, 106 and 108 and at least one or more system indicators 130, 132 and 134. These are coordinated to draw increased levels of attention for additional occurrences of unauthorized behavior. Engagement is done individually, in combinations instantly, or in combinations over time. For example, an operator with no recorded histories of unauthorized behavior initially causes a minimal response of the system 100 such as turning on just the inside dome light. In contrast, an operator with numerous previous violations causes the response of system 100 to activate multiple internal system indicators 130, 132 and 134 and multiple external vehicle indicators 104, 106 and 108.

Figure 5:
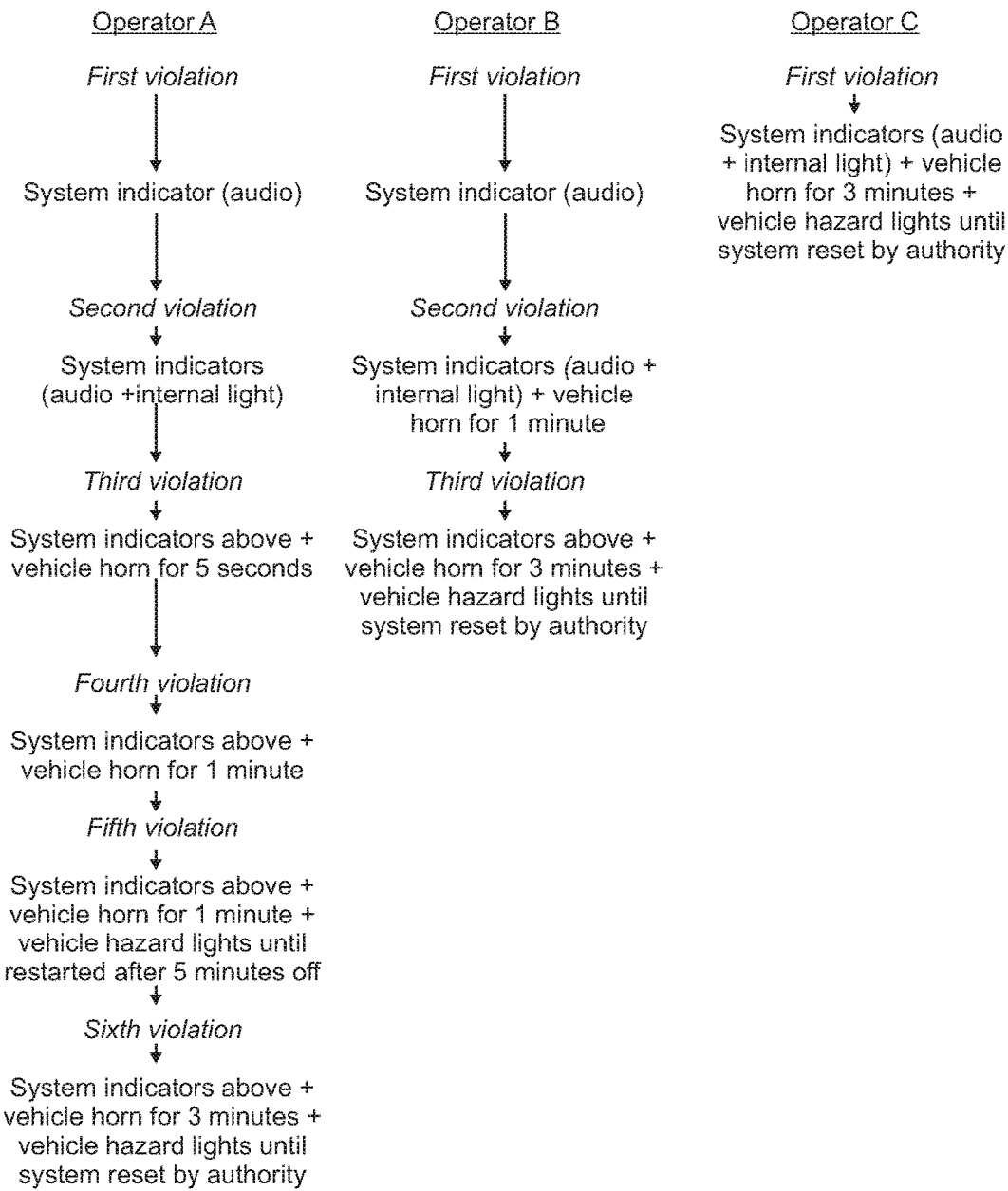
FIG. 5 shows examples of preset response levels and sequences for three sample operators.

FIG. 5 shows examples of preset response levels and sequences for three sample operators. In one embodiment, the system 100 is adaptive and adjusts to operator behavior by changing to different presettable response levels. The response levels and sequences are set up and configured before the vehicle 302 is used with the system 100. The system 100 selectively controls the activation frequency (amount of time between system responses) and the number of system indicators 130, 132 and 134 and vehicle indicators 104, 106 and 108 employed in responses. For example, for an operator who has frequent or an increasing number of violation events in a short period of time, the amount of time between responses and number of indicators 104, 106, 108, 130, 132 and 134 increases. Analogously, the system 100 reduces the activation frequency and number of system indicators 130, 132 and 134 and vehicle indicators 104, 106 and 108 for an operator who reduces the number of violation events over time. The level is preset by the installer when the system 100 is installed to a level directed by an owner of the vehicle 302 or by the authority figure. The preset response levels are associated with known individual operators whose driving records are stored in the controller 102. Alternatively, default levels and sequences are programmed into the controller 102 at installation.

FIG. 5 shows a table of different response sequences for representative operators A, B and C. These example response sequences are meant to illustrate different possible settings and are not intended to limit the system 100 response options. Response sequences are implemented by engaging at least one of one or more vehicle indicators 104, 106 and 108 and at least one or more system indicators 130, 132 and 134. As with response levels, preset response sequences are associated with individual operators.

In one embodiment, Operator A has a history devoid of distracted driving events as recorded in the nonvolatile memory. In this example, the system 100 response to a violation notification is limited on first occurrence to an audio indication by one of the internal system indicators 130, 132 and 134. An example of such an internal audio indication is a voice message or beeping tone. A period of time ordinarily ensues before a second violation. A second violation notification causes the system 100 to respond by playing a different voice message or louder tone plus turning on the dome light. The next occurrence includes both system indicators 130, 132 and 134 and vehicle indicators 104, 106 and 108, such as honking the horn for five (5) seconds. Yet another occurrence causes the system 100 to respond by additional system indicators 130, 132 and 134 and vehicle indicators 104, 106 and 108, an example of which is turning on the horn for sixty (60) seconds. Still another occurrence causes the hazard lights to be turned on with a honking horn. This continues until the vehicle 302 is brought to a full stop and turned off for three (3) minutes. An example of yet a further occurrence response includes internal system indicators 130, 132 and 134 and external vehicle indicators 104, 106 and 108 that remain on until reset by the authority figure.

Example Operator B also has a history devoid of distracted driving events as recorded in the nonvolatile memory. However, after a limited response by the system 100 on the first violation notification, a second violation occurs shortly thereafter. The controller 102 increases the demonstrative effect of the internal system indicators 130, 132 and 134 and external vehicle indicators 104, 106 and 108 by skipping several steps in an example sequence for less frequent violators. A second violation response includes turning on internal vehicle indicators 104, 106 and 108 plus honking the horn for one (1) minute. A third violation occurring after only a short time includes internal system indicators 130, 132 and 134 and external vehicle indicators 104, 106 and 108 that remain on until reset by the authority figure.

Example Operator C has a driving history with several violations recorded by the police. Operator C has demonstrated a resistance to compliant driving behavior. The controller 102 is therefore set to respond with the maximum visibility upon a first occurrence of unauthorized driving behavior.

The present application is a system for modifying driving behavior of the operator of the vehicle 302 by establishing multiple levels of accountability. One embodiment provides a first level of accountability in the operator. To be accountable to authority, the operator must take affirmative action to move a distracting device away from the operator space 304. In another embodiment, the first level of accountability is by the operator who loads and installs the cooperative application 110 on his or her mobile communications device 112. The system 100 provides reminder alerts to the operator when the vehicle 302 is started up. Reminder alerts also occur on occasions in which the operator starts to initiate an unauthorized behavior. Based on an operator's personality, he or she may have the discipline to restrain undesired behavior. In addition to himself or herself, the operator is accountable to the authority figure. The authority figure has the capability of reviewing the data of the event recorder 126 that shows violation actions of the operator. In one embodiment, the authority figure receives messages of violation occurrences or periods with no violations. The authority figure may impose restrictions or punishments that an operator would not self-impose. As such, the higher level of accountability increases the consequences of additional unauthorized behavior. Yet another level of accountability is law enforcement personnel. Law enforcement personnel people have the legal authority in some states to inspect the vehicle 302 when there is an indication of law breaking. In many states, driving while texting or using a phone is illegal. This accountability continues to exist in response to a violation in a visible form until the system 100 is reset. This provides an ongoing possibility that the vehicle 302 will be searched by law enforcement personnel. In such cases, evidence of other crimes can be found and potentially prosecuted. This possibility is a strong deterrent to unauthorized behavior by the operator of the vehicle 302. This further level of accountability for actions increases the effects of behavior decisions and their personal impacts.

In another embodiment of the present application, the access device 140 is used to interact with the controller 102 for multiple purposes. The access device 140 is used during the learning mode to determine the dimensional parameters of the operator space 304 by helping identify the perimeter of the operator space 304. The access device 140 is further used to load or retrieve dimensional parameters in support of installation actions. After initial loads, the access device 140 is used to modify dimensional parameters in the nonvolatile memory. The access device 140 performs calibration operations on the controller 102 to ensure repeatable actions. The access device 140 is also used when the controller 102 is in the diagnostic mode to guide diagnostic operations. A further use of the access device 140 is to retrieve data from the event recorder 126 or from the external memory 124. Such data indicates violation events and their causes, as well as other information that is recorded in the system 100. The access device 140 further sets and adjusts preset levels for different operators. It is also capable of upgrading software of the system 100 through its interfaces. Such tools incorporate access restriction mechanisms to prevent operators and unauthorized personnel from changing parameters of the system 100 against potential wishes of the authority figure.

The system 100 employs technologies to draw attention to and to make a residual record of undesired and unsafe driving behavior. The system 100 establishes multiple levels of accountability structured in order to enforce the importance of focused driving. One or more embodiments provide an effective tool for changing a driver's choice with respect to engaging in distracting actions with the mobile communications device 112. Defined violations of appropriate driving protocols activate attention-causing lights and sounds from the vehicle 302. The attention-causing lights and sounds from the vehicle 302 draw negative public attention to the offender. Advantageously, the system 100 focuses on the root of the problem (violation), an operator's decision, rather than the secondary mechanisms of the activity.

Indications of violations are present at the time of the occurrence. Indications of violations are also present for selective sustained periods of time after the actual occurrence. Furthermore, indications of violations are recorded as events for inspection by designated individuals selected from a group of parents, peers, employers, supervisors and law enforcement personnel and officers of the court. It is an advantage of the system 100 that these multiple levels of accountability for behavior provide an effective deterrence through recognition of the unsafe actions.

The system 100 differentiates between the mobile communications devices 112 located in spaces occupied by the operator of the vehicle 302 and one or more mobile communications devices located in spaces occupied by passengers. The system 100 also differentiates between the mobile communications devices 112 located in spaces occupied by the operator of the vehicle 302 and one or more mobile communications devices located outside the vehicle. The system 100 identifies the location of any mobile communications device 112 within the area normally occupied by the operator of the vehicle 302. Various techniques for determining a location of a radio frequency transmitting device are suitable for this purpose. One embodiment also includes the cooperative application 110 installed voluntarily on the mobile communications device 112 that communicates with the controller 102. A function of the cooperative application 110 is to indicate violations when the vehicle 302 is moving and the operator is attempting to engage the mobile communications device 112 in a way that changes the operator's focus from driving. The cooperative application 110 cooperates with other elements of the system 100 to draw attention only to distracted behavior of the operator of the vehicle 302, not passengers or bystanders. The cooperative application 110 installed on mobile communications devices 112 outside the space normally occupied by the operator of the vehicle 302 does not send violation notifications to the controller 102. A violation notification is a system response that occurs when an operator attempts to engage the mobile communications device 112 while the vehicle 302 is moving.

The system 100 is able to accommodate various types of vehicles 302. Different makes and models have various configurations for the operator's seat area. The system 100 adjusts dimensional parameters that correspond to the size and shape of the operator space 304 for a given type of vehicle 302. Such parameters vary from vehicle to vehicle but are consistent for a given vehicle type of a given model year.

An advantage of the system 100 is that it is capable of adjusting dimensional parameters of the operator space 304 within an individual vehicle 302 based on recognition by the system 100 of external factors. The system 100 also changes other system characteristics on a dynamic basis due to external factors. Examples of such external factors include environmental electronic noise from high voltage power distribution lines, radio frequency transmitters, microwave security systems and sunspots. The system 100 is capable of recognizing such conditions and adapting to them by adjusting control elements to compensate. The system 100 also adjusts the size of the operator space 304 by changing to different dimensional parameters to ensure continued effective operation.

In addition to multiple levels of accountability, the system 100 provides different levels of response to violation notifications. An advantage of the system 100 is that it is set to follow a default response sequence of increasingly demonstrative indications. Alternatively, the response sequence is preset for each particular operator based on factors decided by the authority figure. Examples of such factors include the driving history, previous arrest record, age, physical limitations, and maturity level of the operator. A least demonstrative violation indication involves only internal system indicators 130, 132 and 134. The least demonstrative violation indication serves as a warning to the operator that the system 100 is actively monitoring actions and has detected undesired behavior. Increasingly demonstrative violation indications are based on factors such as frequency or speed of recurrence of violations.

The access device 140 interfaces with the controller 102 to perform numerous functions. One of these functions is the loading or changing of dimensional parameters stored in the nonvolatile memory. Another of these functions is the review of violation events and records of the system 100. Yet another of these functions is the setting and adjusting of preset response levels and sequences. Still another of these functions is to support installation and calibration actions and to perform diagnostic operations. A further one of these functions is the upgrading of software of the system 100 for the vehicle-based elements. A still further advantage of this system 100 is that the access device 140 is physically separated from the controller 102 except during active use to minimize potential operator tampering.

Other solutions attempt to reduce distracted driving by disabling features of the mobile communications device 112. Some other solutions send messages directly to third parties. Still other solutions levy fines in the event of a texting-while-driving event. All of these solutions fail to address the root cause for the aberrant and unacceptable behavior. There exists, therefore, the need for the system 100 that uses public pressure and has multiple levels of accountability for behavior to address this situation.

The terms "a" or "an", as used herein, are defined as one. The term plurality, as used herein, is defined as two or more than two. The term "another", as used herein, is defined as at least a second or more. The terms "including" and "having," as used herein, are defined as comprising (i.e., open language). The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

What is claimed is:

1. A system for modifying distracted driving behavior, comprising:
    a plurality of radio frequency receivers, each radio frequency receiver coupled to an antenna; and
    a controller coupled to nonvolatile memory and to the plurality of radio frequency receivers and to at least one system indicator and at least one vehicle indicator of a vehicle, wherein the controller:
    stores a plurality of preset response levels in the nonvolatile memory, each of the plurality of response levels including a different number of the at least one vehicle indicator and a different number of the at least one system indicator for engaging by the controller,
    defines an operator space within the vehicle,
    receives a periodic control signal from an active mobile communications device,
    based on the received periodic control signal, detects presence within the operator space of the active mobile communications device, and
    in response to occurrence of detection of presence of the active mobile communications device within the operator space, invokes a preset response level, the invoked preset response level based on at least a number of occurrences of detection of presence of the active mobile communications device within the operator space.

2. The system of claim 1 wherein at least one vehicle indicator is detectable from outside the vehicle.

3. The system of claim 2 wherein the controller adjusts to behavior of an operator of the vehicle by changing to a different preset response level.

4. The system of claim 3 wherein the controller associates the active mobile communications device with the operator of the vehicle and wherein the plurality of preset response levels is associated with the operator of the vehicle.

5. The system of claim 2 wherein the controller generates a violation notification when an operator of the vehicle engages the mobile communications device while the vehicle is moving.

6. The system of claim 5 including a radio frequency transmitter coupled to the controller for transmitting the violation notification to an authority figure.

7. The system of claim 5 including a low-power radio frequency transceiver coupled to the controller for transmitting a signal to the mobile communications device.

8. The system of claim 7 wherein the mobile communications device has a cooperative application operating on it, the cooperative application for communicating with the controller.

9. The system of claim 8 wherein the controller sends a handshake signal to the mobile communications device whenever the mobile communications device indicates its presence within the operator space.

10. The system of claim 8 wherein the cooperative application is for communicating with the authority figure.

11. The system of claim 1 wherein the controller has a plurality of modes of operation including at least one of:
    a learning mode for discovering dimensions of the operator space in a previously undetermined vehicle type,
    a calibration mode for adjusting dimensions of the operator space in a vehicle of previously determined vehicle type, and
    a diagnostic mode for validating that elements of the system are operating properly and for validating that the system has not been tampered with.

12. The system of claim 11 wherein parameters of the dimensions of the operator space define a volumetric extent of the operator space through the use of the plurality of radio frequency receivers, each radio frequency receiver coupled to one antenna of a plurality of antennas.

13. The system of claim 11 wherein predetermined parameters of the dimensions of the operator space for a given vehicle type and configuration are loaded in the nonvolatile memory to establish the dimensions of the operator space for a vehicle type and configuration of the vehicle.

14. The system of claim 13 wherein the predetermined parameters of the dimensions of the operator space and other characteristics of the system are adjustable within each vehicle of the given vehicle type based on recognition by the system of environmental electronic noise.

15. The system of claim 1, including an access device communicatively coupled to the controller, the access device for performing at least one of:
    determining dimensional parameters of the operator space,
    loading or retrieving dimensional parameters, and
    modifying dimensional parameters in the nonvolatile memory.

16. The system of claim 1 wherein as the number of occurrences of detection of presence of the active mobile communications device within the operator space increases, the number of the at least one vehicle indicator and the number of the at least one system indicator included within the invoked preset response level increases.

17. The system of claim 1 wherein the invoked preset response level depends on an interval between occurrences of detection of presence of the active mobile communications device within the operator space.

18. The system of claim 17 wherein as the interval between occurrences of detection of presence of the active mobile communications device within the operator space decreases, the number of the at least one vehicle indicator and the number of the at least one system indicator included within the invoked preset response level increases.

19. A method for modifying distracted driving behavior, comprising:
    determining, with a controller, dimensional parameters of an operator space of a vehicle;
    storing the dimensional parameters in a nonvolatile memory of the controller;
    retrieving the dimensional parameters stored in the nonvolatile memory;
    adjusting a preset level of accountability for distracted driving behavior for an operator of the vehicle;
    detecting presence within the operator space of each active mobile communications device having a wireless radio frequency communications transceiver; and
    in response to the detection, the controller interacting with at least one vehicle indicator and at least one system indicator to draw attention to the vehicle and to the operator of the vehicle, wherein the controller enables a level of accountability for distracted driving behavior for each operator of at least two operators of the vehicle, wherein the controller associates each active mobile communications device with an operator of the at least two operators of the vehicle, and wherein, for each operator of the at least two operators, as an interval between recurrence of the detection decreases or a number of detections increases, a number of the at least one vehicle indicator and the at least one system indicator with which the controller interacts increases for such operator.

20. The method of claim 19 wherein the detecting presence within the operator space of each active mobile communications device having the wireless radio frequency communications transceiver occurs only while the vehicle is moving.

\* \* \* \* \*